US006216118B1

United States Patent
Iokibe et al.

(10) Patent No.: US 6,216,118 B1
(45) Date of Patent: Apr. 10, 2001

(54) APPARATUS AND METHOD FOR DISCRIMINATING A TIME SERIES DATA

(75) Inventors: Tadashi Iokibe, Shizuoka; Yasunari Fujimoto, Tokyo, both of (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 08/961,246

(22) Filed: Oct. 30, 1997

(30) Foreign Application Priority Data

Oct. 31, 1996 (JP) .................................................. 8-289658

(51) Int. Cl.[7] ...................................................... G06N 5/00
(52) U.S. Cl. ................................. 706/12; 701/111; 701/96
(58) Field of Search ............................ 706/12; 701/111, 701/96; 702/56, 182; 73/116, 593; 378/57

(56) References Cited

U.S. PATENT DOCUMENTS

| | | | |
|---|---|---|---|
| 5,189,908 | 3/1993 | Sano et al. ............................ | 73/118.1 |
| 5,361,213 | * 11/1994 | Fujieda et al. ....................... | 701/111 |
| 5,386,689 | * 2/1995 | Bozich et al. ........................ | 60/39.33 |
| 5,446,828 | 8/1995 | Woodall ................................. | 395/23 |
| 5,465,219 | * 11/1995 | Jeffers .................................. | 700/274 |
| 5,493,516 | * 2/1996 | Broomhead et al. ................ | 702/109 |
| 5,506,795 | 4/1996 | Yamakawa .......................... | 364/717 |
| 5,506,996 | 4/1996 | Wang et al. ......................... | 395/800 |
| 5,537,435 | 7/1996 | Carney et al. ....................... | 375/219 |
| 5,576,632 | 11/1996 | Petsche et al. ....................... | 324/772 |
| 5,671,336 | 9/1997 | Yoshida et al. ...................... | 395/24 |
| 5,710,715 | * 1/1998 | Shitanda .............................. | 702/56 |
| 5,752,214 | * 5/1998 | Minowa et al. ..................... | 701/111 |
| 5,869,752 | * 2/1999 | Klauber et al. ....................... | 73/116 |
| 5,902,345 | * 5/1999 | Minowa et al. ..................... | 701/96 |
| 6,041,287 | * 3/2000 | Dister et al. ......................... | 702/182 |
| 6,049,586 | * 4/2000 | Kitiguchi et al. .................... | 378/57 |
| 6,053,047 | * 4/2000 | Dister et al. ......................... | 73/593 |

OTHER PUBLICATIONS

Roehl, N.M.; Pedreira, C.E.; Teles De Azevedo, H.R., Fuzzy ART neural network approach for incipient fault detection and isolation in rotating machines, Neural Networks, 1995. Proceedings., IEEE International Conference on, vol.: 1, Nov. 27–Dec. 1, 1995.*
McCormick, A.C.; Nandi, A.K., Real–time classification of rotating shaft loading conditions using artificial neural networks, Neural Networks, IEEE Transactions on, vol.: 8, May 3, 1997, Pp.: 748–757.*
McCormick, A.C.; Nandi, A.K., Neural network autoregressive modeling of vibrations for condition monitoring of rotating shafts, Neural Networks, 1997., International Conference on, vol.: 4, Jun. 9–12, 1997, Pp.: 2214–2218 vol.4.*
Zhao Lindu; Sheng Zhaohan, Combination of discrete cosine transform with neural network in fault diagnosis for rotating machinery, industrial Technology, 1996. (ICIT '96)., Proceedings of The IEEE International Conference on, Dec. 2–6, 1996, Pp.: 450.*
Seidl, D.R.; Lam, S.–L.; Putnam, J.A.; Lorenz, R.D., Neural network compensation of gear backlash hysteresis in position–controlled mechanisms, Industry Applications Society Annual Meeting, 1993., Conference Record of the 1993 IEEE, Oct. 2–8, 1993, Page(s).*
Seidl, D.R.; Sui–Lun Lam; Putman, J.A.; Lorenz, R.D. Neural network compensation of gear backlash hysteresis in position–controlled mechanisms, Industry Applications, IEEE Transactions on, vol.: 31 6, Nov.–Dec. 1995, Pp.: 1475–1483.*
Date et al., "Fuzzy Model for Inference of Degree of Laugh" *Journal of Japan Society for Fuzzy Theory and Systems* 9:149–158 (1997).

* cited by examiner

*Primary Examiner*—Mark Powell
*Assistant Examiner*—Wilbert Starks
(74) *Attorney, Agent, or Firm*—Foley & Lardner

(57) ABSTRACT

Described are method and apparatus for discriminating whether a time series data is a deterministic chaos or a stochastic chaos. In the method and apparatus, a trajectory parallel measuring method is used to discriminate the observed time series data.

8 Claims, 11 Drawing Sheets

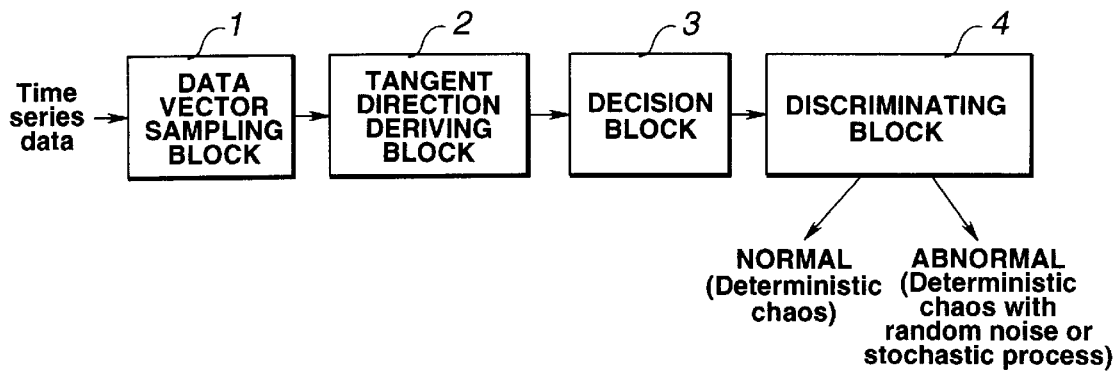
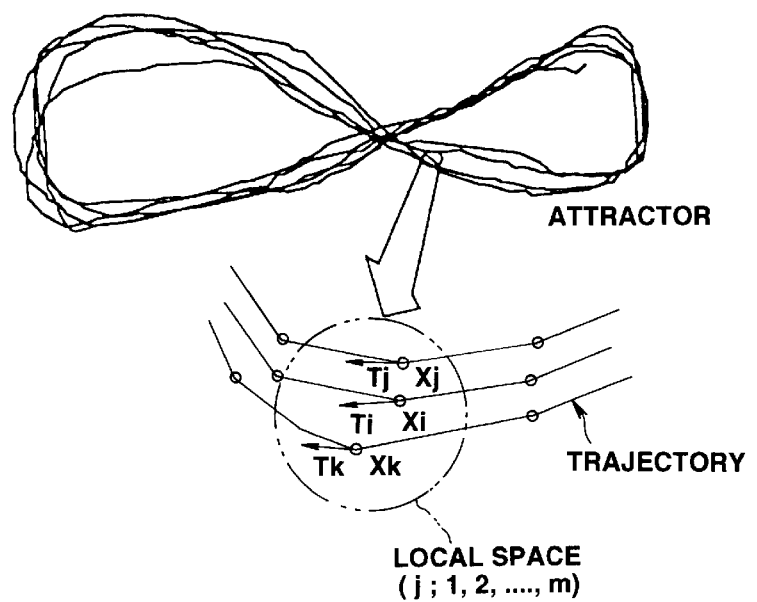

ATTRACTOR WITH NO RANDOM NOISE ADDED

WHEN AN ABNORMALITY IS ADDED TO THE SYSTEM

ATTRACTOR WITH RANDOM NOISE ADDED

FIG.12A
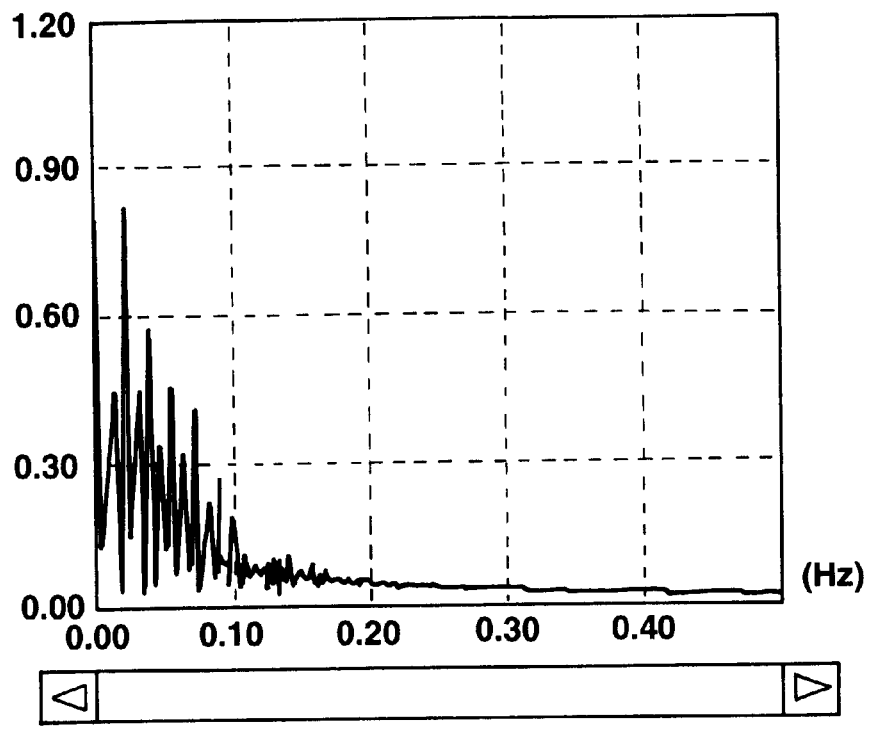
FIG.12B
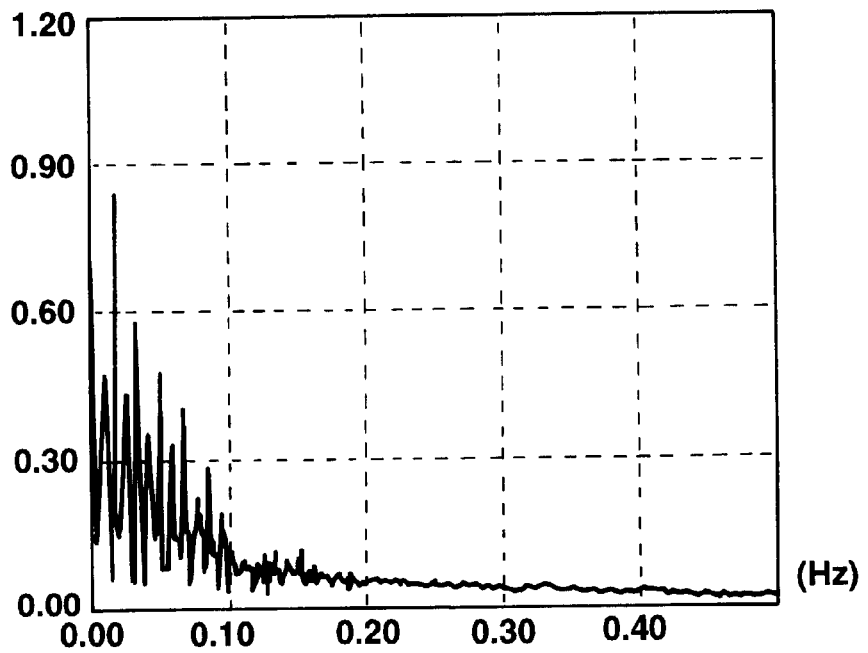

APPARATUS AND METHOD FOR DISCRIMINATING A TIME SERIES DATA

The contents of a Patent Application Heisei 8-289658, with a filing date of Oct. 31, 1996 in Japan, are herein incorporated by reference.

BACKGROUND OF THE INVENTION a) Field of the invention

The present invention relates to a method and apparatus for discriminating a time series data, particularly and, relates to a method and apparatus for discriminating whether the time series data is based on a determinism (,e.g., deterministic signal) or based on a stochastic process (,e.g., random signal).

b) Description of the Related Art

For example, in a rotary mechanical system, when a shaft vibration is abnormal, the observed time series data is synthesized with those based on the determinism and with those based on a stochastic process such as random noises.

It is frequent that irregular-looking time series data may be caused by determining dynamics, and also well known that it is called deterministic chaos. Nowadays, even if the time series data observed from a system has a little noise, it is not always easy, by eye, to recognize whether or not it has some noise. To solve this issue, in general, there is a method of extracting some characteristic frequency by FFT (Fast Fourier Transformation) analysis. But chaotic time series is composed of an infinite number of frequency elements, and give rise to a broad continuous power spectrum.

The characteristic determining method described above using the FFT analyzing method will briefly be described below.

That is to say, at a first step, the time series data observed from the rotary mechanical system is derived from an observer.

At a second step, the observed time series data are analyzed using the FFT analyzer.

At a third step, from the result of spectrum analysis using the FFT analyzer, a characteristic frequency is selected.

At a fourth step, the selected characteristic frequency value is compared with an analyzed value of a normal data which is previously spectrum analyzed using the FFT analyzer.

Finally, the spectrum analyzer determines whether the selected value of the characteristic frequency at the third step is normal or abnormal according to the result of the comparison at the fourth step.

A U.S. Pat. No. 5,576,632 issued on Nov. 19, 1997 exemplifies the FFT analysis for a measurement for a motor current.

SUMMARY OF THE INVENTION

As described above in the BACKGROUND OF THE INVENTION, the method for extracting the characteristic frequency from the time series data through the spectrum analysis using the FFT analyzer cannot clearly discriminate whether the time series data is based on the determinism or based on the stochastic process.

For example, as a result that the spectrum analysis using the FFT analyzer is carried out after the characteristic data of the time series data on a Rössler chaos as a representative of the deterministic chaos (refer to FIGS. 9A and 10A) is compared with the characteristic data of the time series data on the Rössler chaos to which an element of a stochastic process system (10% of the white noise) is added (refer to FIGS. 9B and 10B), no clear difference between the results of the FFT spectrum analysis for the time series data to which no white noise is added or to which 10% white noise is added is obtained as shown in FIGS. 11A and 11B and FIGS. 12A and 12B.

Consequently, it was indicated that the discrimination between the time series data in the deterministic system and in the stochastic process system was clearly difficult.

Hence, the abnormality in the shaft vibration cannot clearly be detected even if the spectrum analysis using the FFT analyzer is carried out to detect the abnormality in the shaft vibration of the rotary mechanical system.

It is therefore an object of the present invention to provide a method and apparatus for discriminating the time series data which can accurately discriminate whether the time series data is based on the determinism or based on the stochastic process.

The above-described object can be achieved by providing a method for discriminating a time series data observed from a dynamical system, comprising the steps of:

a) embedding the time series data y(t) in an n-dimensional reconstructed state space;

b) selecting an arbitrary data vector Xi from trajectories of the embedded time series data;

c) selecting, in terms of Euclidian distance, m data vectors Xj (j=1, 2, - - - , m) neighboring to the selected data vector Xi;

d) deriving tangential unit vectors Ti and Tj with respect to the data vectors Xi and Xj;

e) calculating variations in directions relative to the tangential unit vectors Tj of the neighboring data vectors by referring to the tangential unit vectors Ti as follows:

$$\gamma i = 1/4m \times \sum_{j}^{m} \|Ti - Tj\|^2;$$

f) iterating the calculation of $\gamma$; at the previous step for a predetermined sample number k which corresponds to subspaces to derive a mean value $\Gamma$:

$$\Gamma = 1/k \sum_{i}^{k} \gamma i;$$

g) determining whether $\Gamma \approx 0$; and h) discriminating whether the observed time series data is deterministic chaos or a stochastic process according to a result of determination on the mean value $\Gamma$.

The above-described object can also be achieved by providing an apparatus for discriminating a time series data observed from a dynamical system, comprising:

a) means for embedding the time series data y(t) in an n-dimensional state space;

b) means for selecting an arbitrary data vector Xi from trajectories of the embedded time series data;

c) means for selecting, in terms of Euclidian distance, m data vectors Xj (j=1, 2, - - - , m) neighboring to the selected data vector Xi;

d) means for deriving tangential unit vectors Ti and Tj with respect to the data vectors Xi and Xj;

e) means for calculating variations in directions relative to the tangential unit vectors Tj of the neighboring data vectors by referring to the tangential unit vectors Ti as follows:

$$\gamma i = 1/4m \times \sum_{j}^{m} \|Ti - Tj\|^2;$$

f) means for iterating the calculation of γ; at the calculating means for a predetermined sample number k which corresponds to subspaces to derive a mean value Γ:

$$\Gamma = 1/k \sum_{i}^{k} \gamma i;$$

g) means for determining whether Γ≈0; and h) means for discriminating whether the observed time series data is deterministic chaos or a stochastic process according to a result of determination on the mean value Γ.

The above-described object can also be achieved by providing an apparatus for discriminating a time series data observed from a dynamical system constituting a vehicular automatic transmission, said apparatus comprising:

a) a detector for observing a shaft vibration sound of the automatic transmission;

b) a converter for converting the shaft vibration sound into a digital discrete signal;

c) a first processor for providing the time series data y(t) according to the digital discrete signal;

d) a second processor for embedding the time series data y(t) in an n-dimensional state space;

e) a first selector for selecting an arbitrary data vector Xi from trajectories of the embedded time series data;

f) a second selector for selecting, in terms of Euclidian distance, m data vectors Xj (j=1, 2, - - - , m) neighboring to the selected data vector Xi;

g) a first calculator for deriving tangential unit vectors Ti and Tj with respect to the data vectors Xi and Xj;

h) a second calculator for calculating variations in directions relative to the tangential unit vectors Tj of the neighboring data vectors by referring to the tangential unit vectors Ti as follows:

$$\gamma i = 1/4m \times \sum_{j}^{m} \|Ti - Tj\|^2;$$

i) a third calculator for iterating the calculation of γ; at the second calculator for a predetermined sample number k which corresponds to subspaces to derive a mean value Γ:

$$\Gamma = 1/k \sum_{i}^{k} \gamma i;$$

j) a first determinator for determining whether Γ≈0;

k) a discriminator for discriminating whether the observed time series data is deterministic chaos or a stochastic process according to a result of determination on the mean value Γ by said first determinator; and l) a second determinator for determining that a shaft vibration of the automatic transmission has abnormality when said discriminator discriminates that the observed time series data is the stochastic process.

BRIEF DESCRIPTION OF THE DRAWINGS

FIG. 1 is a functional block diagram of a time series data discriminating apparatus according to the present invention.

FIG. 2 is a schematic view of a strange attractor of embedded time series data in an n-dimensional state space and of a local subspace of trajectories in the strange attractor carried out in the first embodiment shown in FIG. 1.

FIG. 12A is a corresponding expanded characteristic graph of the Rössler chaos time series data shown in FIG. 11A as the result of the previously proposed FFT analysis.

FIG. 12B is a corresponding expanded characteristic graph of the Rössler chaos time series data shown in FIG. 11B to which 10% white noise is added as the result of the previously proposed FFT analysis.

BEST MODE FOR CARRYING OUT THE INVENTION

Reference will hereinafter be made in order to facilitate a better understanding of the present invention.

FIG. 1 shows a functional block diagram of an apparatus for discriminating a time series data in a first preferred embodiment according to the present invention.

FIG. 2 shows an example of the time series data embedded into an n-dimensional state space (a strange attractor).

Figure 3:
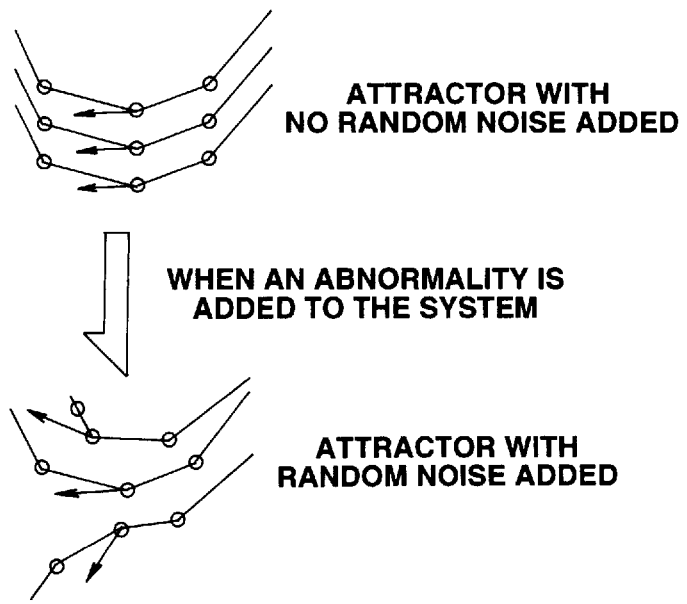
FIG. 3 are schematic views of one of the local subspaces to explain the neighboring vectors in the trajectories when the time series data includes no random noise and when the time series data includes the random noise.

FIG. 3 shows a local characteristic view of the strange attractor with no random noise added or with the random noise added.

In FIG. 1, a first observer (data vector observing block) 1 for observing an arbitrary data vector Xi from the time series data embedded into the n-dimensional vector (n: natural number) shown in FIG. 2 is provided in the time series data discriminating apparatus.

The term of the n-dimensional vector is exemplified by a U.S. Pat. No. 5,446,828 issued on Aug. 29, 1995(, the disclosure of which is herein incorporated by reference).

A (second) tangent direction observer (tangent direction determining block) 2 for observing a plurality of tangent directions Ti, - - -, Tk, - - -, Tj with respect to respectively corresponding solution trajectories within a neighboring space (shown in FIG. 2) to the arbitrary data vector Xi, the data vector Xi inclusive.

The solution trajectories are exemplified by a U.S. Pat. No. 5,671,336 issued on Sep. 23, 1997 (, the disclosure of which is herein incorporated by reference).

A decision block 3 determines whether the tangent directions determined by the tangent direction determining block 2 are mutually and generally the same or not.

If the result of determination at the decision block 3 indicates that the determined directions are mutually and generally the same, the observed time series data is the time series data based on an ideal determinism. If the result of determination at the decision block 3 indicates that the determined tangent directions are not mutually and generally the same, i.e., the determined tangent directions are individually different as shown in FIG. 3, the subsequent discriminating block 4 determines that an abnormality occurs in a system which develops the time series data, namely, the tangent directions become random due to an application of the random noise to the time series data so that the observed time series data is based on a stochastic process.

Figure 4:
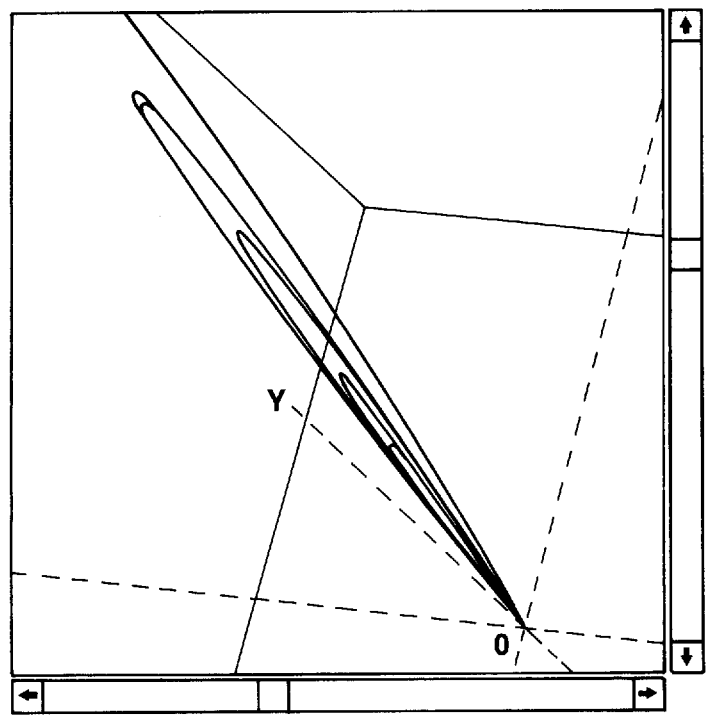
FIG. 4 is a displayed view of an attractor graph of a Rössler chaos representing the time series data based on a determinism.

FIG. 4 shows an attractor graph of a Rössler chaos which represents the time series data of the deterministic chaos.

Figure 5:
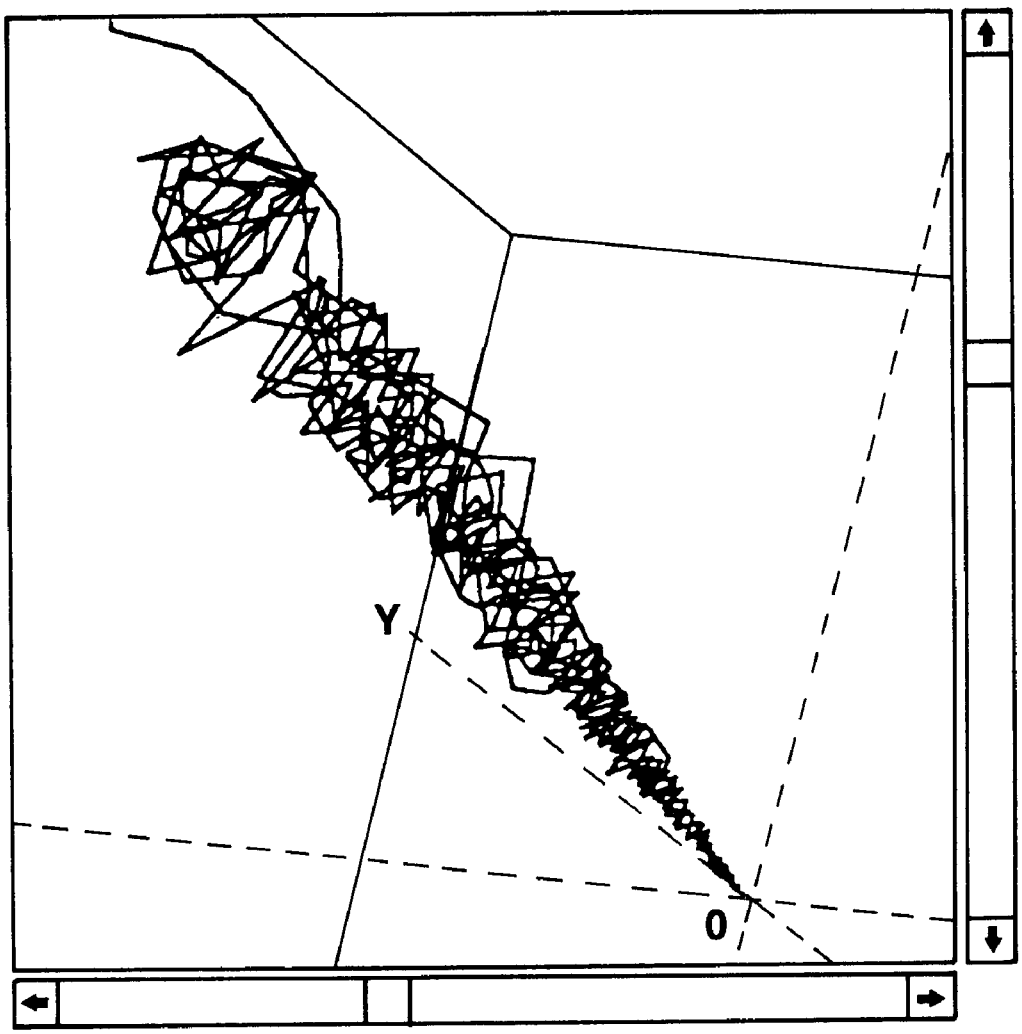
FIG. 5 is a displayed view of another attractor graph of the Rössler chaos in which 10% random noise is added.

FIG. 5 shows another attractor graph of the Rössler chaos which represents the time series data of the deterministic chaos and which receives the influence of a white noise.

As shown in FIG. 4, the attractor when the data without influence of the white noise or random noise are embedded draws a smooth trajectory.

However, if the influence of the white noise or random noise is received, the trajectory of the attractor graph becomes random (mutually opposite) as shown in FIG. 5.

As appreciated from a part of the attractor graph in FIG. 4, the time series data of the deterministic chaos without influence of the noise indicated that their data are streamed mutually and generally in the same direction.

In the first embodiment, a trajectory parallel method is used to discriminate whether the inputted (observed) time series data is the deterministic chaos or the stochastic process.

In detail, at the data vector observing block 1, the observed time series data y(t) is embedded in the n-dimension by a Taken's theory. (This is valid when the embedding dimension n is n≧2p+1 (wherein p is the dimension of an original dynamical system). If n<2p+1, the trajectories may be intersected in a local subspace, because different parts in the original time series are mapped into the state space.)

It is noted that the Taken's theory is described in a book of a title of "Detecting Strange Attractor in Turbulence" authored by F. Takens in Dynamic Systems and Turbulence, Warwick, 1980, editors D. A. Rand, L. S. Young (Springer, Berlin, 1981), page 366.

Then, the embedded vector Xt is derived as Xt={y(t), y(t−τ), - - -, y(t−(n−1)τ)} - - - (1), wherein τ denotes a delay time.

Next, at the data vector observing block 1, the arbitrary vector Xi={y(i), y(i−τ), - - -, y(i−(n−1)τ)} is randomly selected from among the trajectories.

Next, at the data vector observing block 1, in terms of Euclidian distance, m data vectors Xj (j=1, 2, - - -, m) neighboring to Xi are selected.

Next, at the tangent direction determining block 2, tangential unit vectors Ti and Tj with respect to the arbitrary vector Ti and neighboring vectors Xj are derived. Since the tangential unit vector cannot be easily, idealistically derived from a time series by rigorous methods, a hypercircle that passes through the three points consisting of the selected point Xi, the previous point Xi−1, and the next point Xi+1, is constructed. Next, a tangential unit vector Ti is approximately derived as a tangent to the hypercircle at Xi. Similarly, Tj is obtained. By referring to the tangential unit vectors Ti, variations in the directions relative to the tangential unit vectors Tj of the neighboring data vectors are calculated by the following equation (2) at the tangent direction determining block 2.

$$\gamma i = (1/4m) \times \sum_{j}^{m} \|Ti - Tj\|^2. \quad (2)$$

These calculations are carried out for k subspaces sampled randomly from the attractor shown in FIGS. 2 and 3.

Next, at the decision block 3, to statically determine the status of the trajectories of the attractor, a mean value is calculated by the following equation (3).

$$\Gamma = 1/k \sum_{i}^{k} \gamma i. \quad (3)$$

As a result of the above, the decision block 3 can conclude that as the value Γ is closer to zero, the trajectories in local spaces will be closer in the same directions. Namely, the observed time series data is generated by the determinism. Conversely, as the result is closer to 0.5, the trajectory will be more orthogonal in the local spaces. The closer to the result is 1, each trajectory vector will be closer in the opposite directions. In particular, a result close to 0.5 means that the observed time series data is a stochastic process.

For practical applications, these calculations are iterated to decrease statistic errors.

Next, a second preferred embodiment of the time series data discriminating apparatus will be described below.

Figure 6:
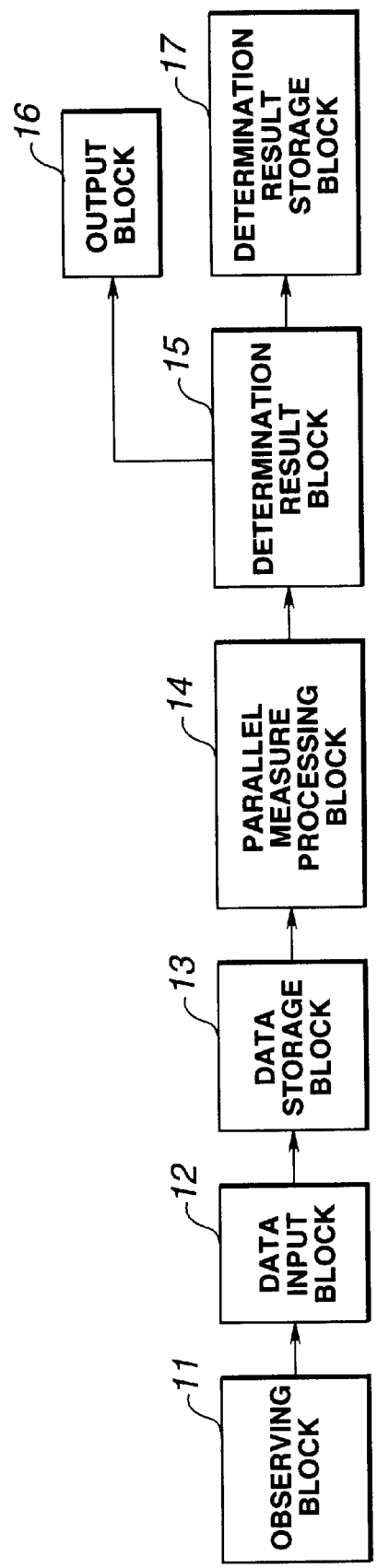
FIG. 6 is a functional block diagram of the time series data discriminating apparatus in a second preferred embodiment according to the present invention.

FIG. 6 shows a functional block diagram of the second preferred embodiment according to the present invention.

In FIG. 6, an observing block 11 measures the time series data from a dynamical system to be measured. A data input block 12 fetches the observed time series data thereinto. Then, a data storage block 13 fetches and stores the observed time series data thereinto. The stored time series data is inputted to a parallel measure processing block 14 in which a series of processing shown in FIG. 7 is carried out.

At the parallel measure processing block 14, the tangential units for the embedded vectors are derived and a degree of parallel using the trajectory parallel measure method is carried out to determine the parallel of the tangent. At a determination result block 15, the time series data is determined whether it includes the noise according to the determined value of the parallel of the tangents. The result of determination at the determination result block 15 is supplied to an output block 16 having a monitoring unit to indicate the result of determination and is stored in a determination result storage block 17.

Figure 7:
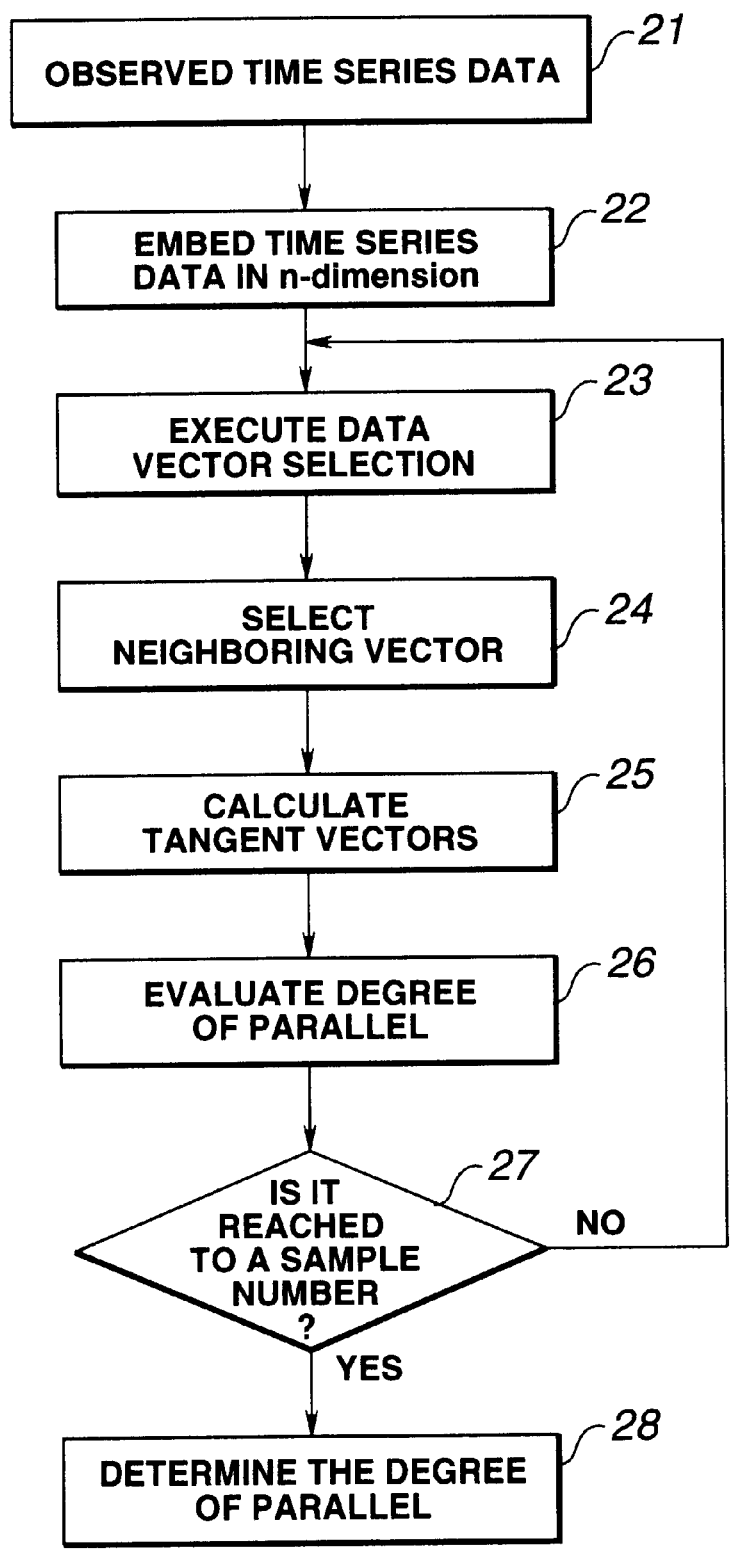
FIG. 7 is an operational flowchart executed in the second embodiment shown in FIG. 6.

FIG. 7 shows a processing flowchart carried out at the parallel measure processing block 14.

At a step 21, the stored time series data is fetched in the form of the strange attractor, for example, as shown in FIGS. 2 and 3.

At a step 22, the fetched time series data y(t) is embedded in the n-dimensional state space (n: natural number) in accordance with the equation (1).

It is noted that n and $\tau$ (delay time) are previously set according to the dynamical system to be measured.

At a step 23, the arbitrary data vector Xi is randomly selected among the trajectories in the strange attractor; Xi $\{y(i), y(i-\tau), - - -, y(i-(n-1)\tau)\}$.

At a step 24, in terms of Euclidian distance, m data vectors Xj (j=1, 2,- - - , m) neighboring to Xi are selected.

Figure 13A:
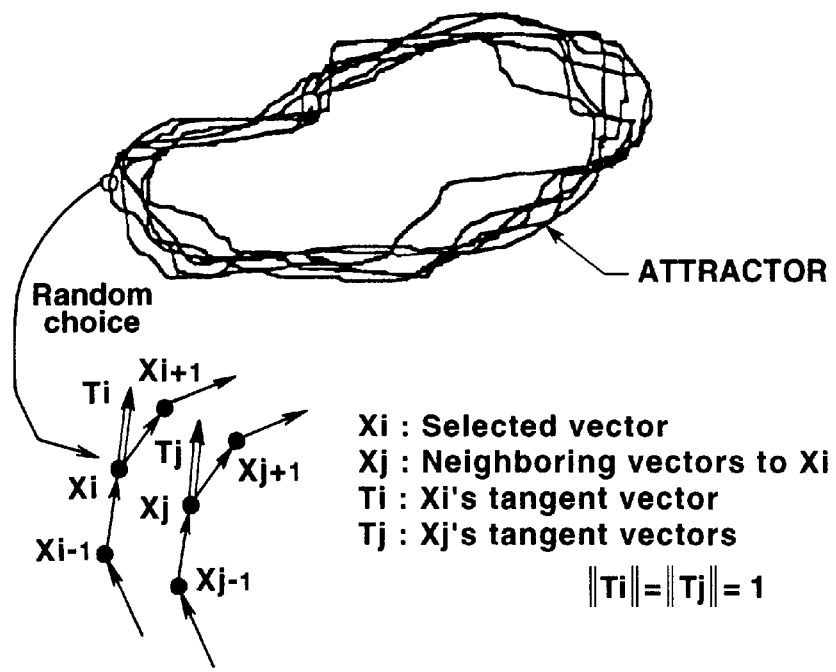
FIGS. 13A and 13B are explanatory views of deriving tangential unit vectors Ti and Tj with respect to the data vectors Xi and Xj carried out in the first and second embodiments shown in FIG. 1 and FIG. 7.

At the next step 25, tangential unit vectors Ti and Tj are derived as shown in FIG. 13A.

Figure 13B:
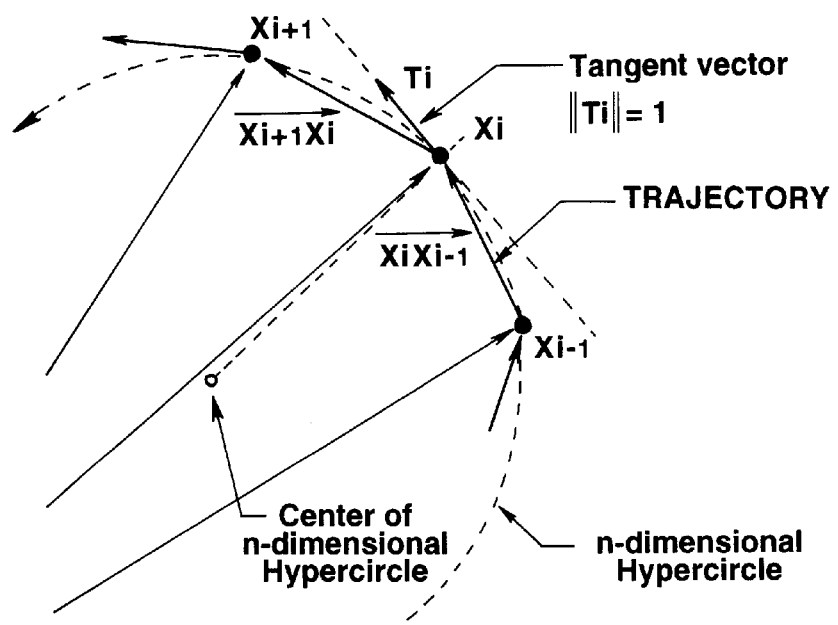

At the step 25, the hypercircle that passes through the three points consisting of the selected Xi, the previous point Xi−1, and the next point Xi+1 is constructed as shown in FIG. 13B. Next, the tangential unit Ti is approximately derived as a tangent on the hypercircle at Xi as shown in FIG. 13B.

Similarly, Tj is obtained. By referring to the tangential unit vectors Ti, variations γi in the directions relative to the tangential unit vectors Tj of the neighboring data vectors are calculated by the equation (2). These calculations are carried out for k subspaces sampled randomly from the attractor.

Next, the statistically determine the status of the trajectories of the attractor, a mean value Γ is calculated by the equation (3) at the step S26.

Then, at a step 27, the mean value Γ derived at the step 26 is determined to be reached to a predetermined sample number K to decrease the statistic number.

At the step 28, the value Γ is determined whether Γ is approximately zero or approximately 0.5.

If Γ≈0.5 or nearer to 1, the determination result block 15 determines that the time series data is the stochastic process.

It is noted that if Γ≈0, the determination result block 15 determines that the time series data is the deterministic.

Figure 8:
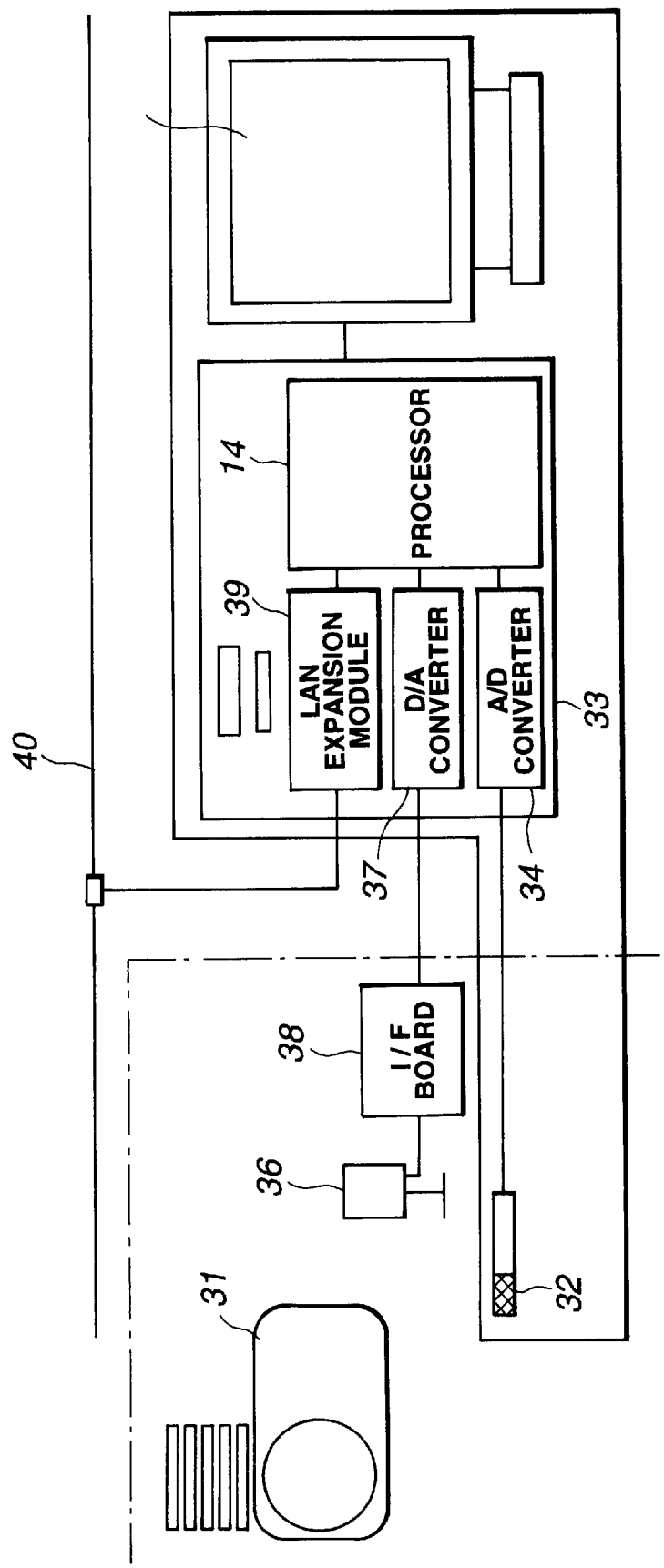
FIG. 8 is a structural explanatory view of a shaft vibration abnormality detecting apparatus for a rotary mechanical system such as a vehicular automatic transmission to which the present invention is applicable.
Figure 9A:
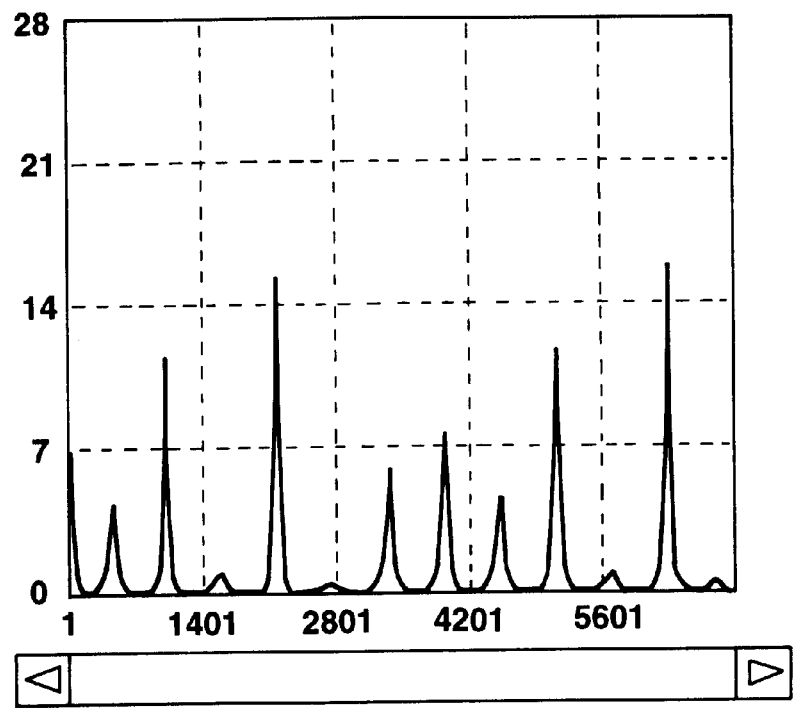
FIG. 9A is a characteristic graph of the Rössler chaos time series data.
Figure 9B:
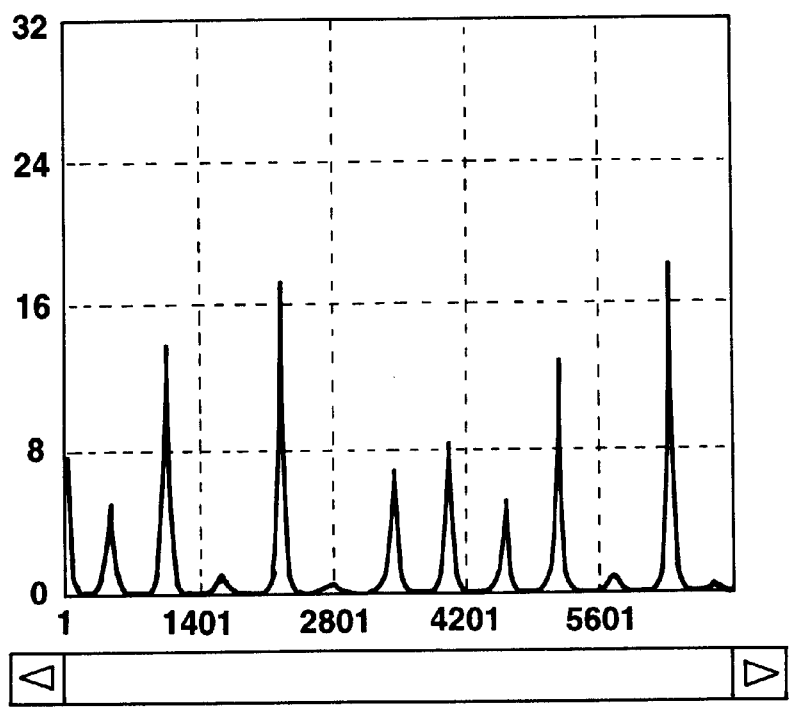
FIG. 9B is a characteristic graph of the Rössler chaos time series data to which 10% white noise is added.
Figure 10A:
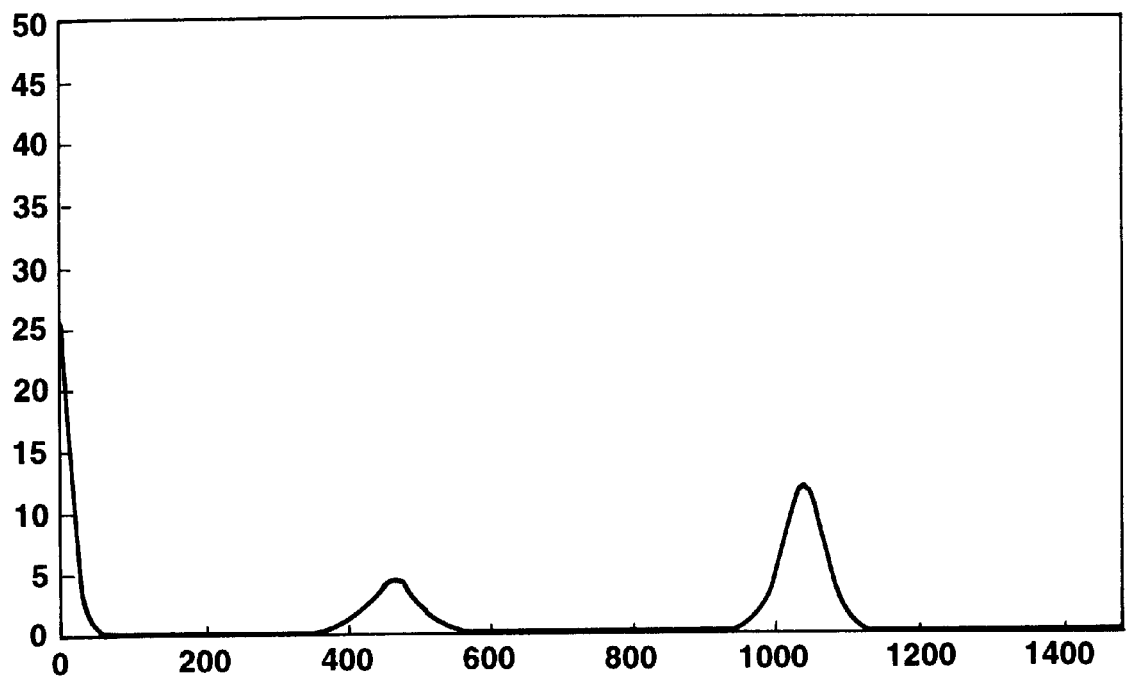
FIG. 10A is an expanded characteristic graph of the Rössler chaos time series data shown in FIG. 9A.
Figure 10B:
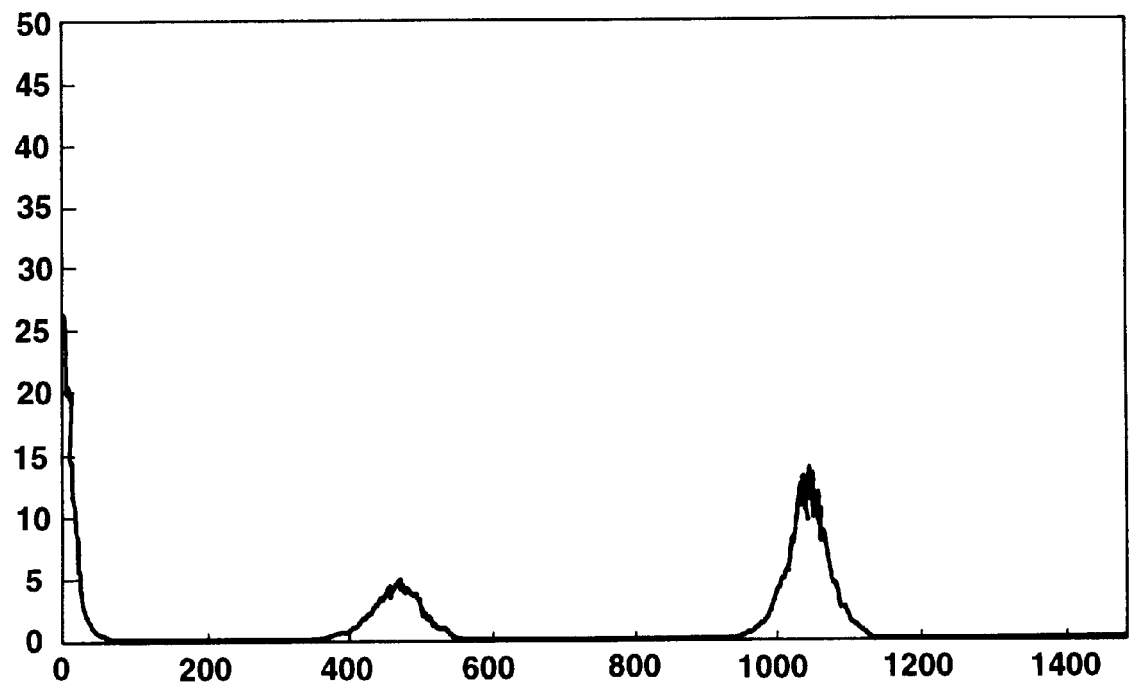
FIG. 10B is an expanded characteristic graph of the Rössler chaos time series data shown in FIG. 9B to which 10% white noise is added.
Figure 11A:
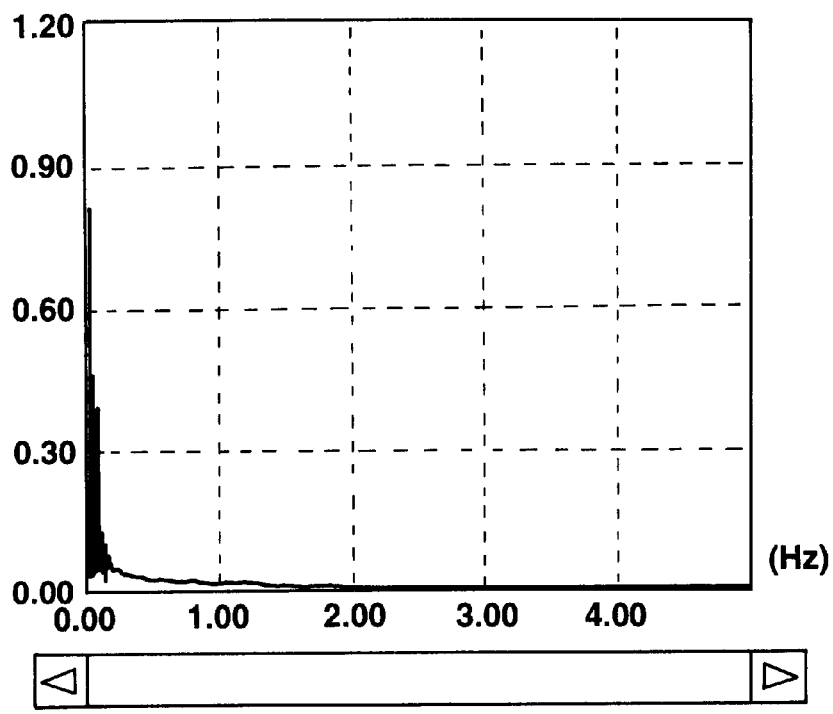
FIG. 11A is a characteristic graph of the Rössler chaos shown in FIG. 9A as a result of a previously proposed FFT analysis.
Figure 11B:
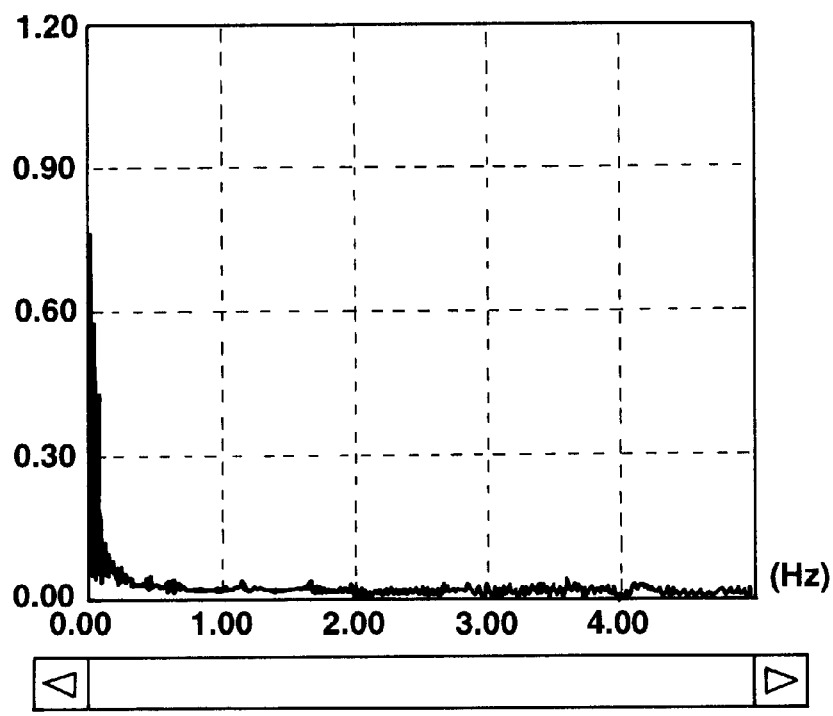
FIG. 11B is a characteristic graph of the Rössler chaos shown in FIG. 9B as the result of the FFT analysis.

FIG. 8 shows a specific structural block diagram of the discriminating apparatus according to the present invention which is applicable to a shaft vibration abnormality detecting apparatus in a rotary mechanical system, e.g., a vehicular automatic transmission shaft vibration abnormality detecting apparatus.

In FIG. 8, while an automatic transmission 31 to be measured is installed, a testing system of the automatic transmission 31 to be installed in the vehicle is exemplified by a U.S. Pat. No. 5,189,908 issued on Mar. 2, 1993 (, the disclosure of which is herein incorporated by reference).

The detector 32, e.g., a microphone, detects a sound signal generated during the test of the automatic transmission 31. The detected sound signal is converted into a corresponding digital data by means of an A/D converter 34. This data is processed at the parallel measure processing block 14 shown in FIG. 6 to detect an abnormal sound which would be generated from the malfunctioning automatic transmission 31. The detected result is displayed in a CRT (Cathode Ray Tube) display unit 35, or in a monitoring board 36, or used to stop the operation of the testing system. It is noted that 37 denotes an D/A (Digital-to-Analog) converter, and 38 denotes an interface board, 39 denotes a LAN expansion module, 40 denotes a transmission path to transmit a result of determination to another computer.

In the above-described example shown in FIG. 8, the present invention is applicable to such a system as detecting an abnormal sound of the rotary mechanical system.

The present invention is also applicable to a pressure-responsive sensor system or to a temperature-responsive sensor system.

Or alternatively, an abnormal sound detection system in which the abnormal sound is generated due to a damage in a piping system.

The present invention is also applicable to an abnormality detection system for a gear pump arrangement of a vehicular power assisted steering system.

It is noted that the embedded vector of the time series data to be under the time series data discrimination and to be expressed as Xt=$\{y(t), y(t-\tau), y(t-2\tau), - - -, y(t-(n-1)\tau)\}$ indicates one point of the n-dimensional state space $R^n$.

If the time t is varied, trajectories can be drawn in the n-dimensional state space.

In details, if the time series data is derived from the attractor of the original dynamic system, such an attractor as storing a phase structure of the attractor can be reproduced in the state space. Hence, since the embedded vector Xt is moved on the reproduced attractor, the position after an s step Xt+s can be predicted in a short term as Xt+s=$\{y(t+s), y(t+s-\tau), y(t+s-2\tau), - - -, y(t+s-(n-1)\tau)\}$.

A component y(t+s) of the data vector Xt is a time series data s step ahead of the observed time point Xt and this value provides for a predicted value at a position the s step ahead. If s>τ, y(t+s−τ) provides the predicted value.

In FIGS. 9A through 12B, numerical equations to generate the Rössler chaos based on the determinism are as follows: dx(t)/dt=−y(t)−z(t), dy(t)/dt=x(t)+0.2y(t), dz(t)/dt= 0.2−5z(t)+x(t)z(t) (initial values: x(0)=0, y(0)=4, z(0)=28 and the number of data is 6000).

What is claimed is:

1. An apparatus for discriminating a time series data observed from a dynamical system comprising a vehicular automatic transmission, the apparatus comprising:

a detector for observing a shaft vibration sound of the automatic transmission;

a converter for converting the shaft vibration sound into a digital signal;

a processor for providing the time series data according to the converted digital signal;

means for embedding the time series data y(t) in an n-dimensional state space;

means for selecting an arbitrary data vectors Xi from trajectories of the embedded time series data;

means for selecting, in terms of Euclidian distance, m data vectors Xj (j=1, 2, - - - , m) neighboring to the selected data vector Xi;

means for deriving tangential unit vectors Ti and Tj with respect to the data vectors Xi and Xj;

means for calculating variations in directions relative to the tangential unit vectors Tj of the neighboring data vectors by referring to the tangential unit vectors Ti as follows:

$$\gamma i = 1/4m \times \sum_{j}^{m} \|Ti - Tj\|^2;$$

means for iterating the calculation of γi at the calculating means for a predetermined sample number k which corresponds to subspaces to derive a mean value Γ:

$$\Gamma = 1/k \sum_{i}^{k} \gamma i;$$

means for determining whether Γ=0; and means for discriminating whether the observed time series data is deterministic chaos or a stochastic process according to a result of the determination of the mean value Γ.

2. An apparatus for discriminating a time series data observed from a dynamical system as claimed in claim 1, which further comprises a display unit for displaying the result of the determination by said discriminating means whether the observed time series data is the deterministic chaos or the stochastic process.

3. An apparatus for discriminating a time series data observed from a dynamical system as claimed in claim 2, wherein when said discriminating means discriminates that the observed time series data is the stochastic process, said discriminating means informs that the vehicular automatic transmission malfunctions through the display unit.

4. An apparatus for discriminating a time series data observed from a dynamical system constituting a vehicular automatic transmission, said apparatus comprising:

a) a detector for detecting a shaft vibration sound of the automatic transmission;

b) a converter for converting the shaft vibration sound into a digital discrete signal;

c) a first processor for providing the time series data y(t) according to the digital discrete signal;

d) a second processor for embedding the time series data y(t) in an n-dimensional state space;

e) a first selector for selecting an arbitrary data vector Xi from trajectories of the embedded time series data;

f) a second selector for selecting, in terms of Euclidian distance, m data vectors Xj (j=1, 2, - - - , m) neighboring to the selected data vector Xi;

g) a first calculator for deriving tangential unit vectors Ti and Tj with respect to the data vectors Xi and Xj;

h) a second calculator for calculating variations in directions relative to the tangential unit vectors Tj of the neighboring data vectors by referring to the tangential unit vectors Ti as follows:

$$\gamma i = 1/4m \times \sum_{j}^{m} \|Ti - Tj\|^2;$$

i) a third calculator for iterating the calculation of γi at the second calculator for a predetermined sample number k which corresponds to subspaces to derive a mean value Γ:

$$\Gamma = 1/k \sum_{i}^{k} \gamma i;$$

j) a first determinator for determining whether Γ≈0;

k) a discriminator for discriminating whether the observed time series data is deterministic chaos or a stochastic process according to a result of the determination of the mean value Γ by said first determinator; and l) a second determinator for determining that a shaft vibration of the automatic transmission has an abnormality when said discriminator discriminates that the observed time series data is the stochastic process.

5. An apparatus for discriminating a time series data observed from a dynamical system constituting a vehicular automatic transmission as claimed in claim 4, wherein the discriminator determines that the observed time series data is the deterministic chaos when determining that the mean value Γ indicates approximately zero.

6. An apparatus for discriminating a time series data observed from a dynamical system constituting a vehicular automatic transmission as claimed in claim 5, wherein the discriminator determines that the observed time series data is the stochastic process when determining that the mean value Γ indicates approximately 0.5 or nearer to 1.

7. An apparatus for discriminating a time series data observed from a dynamical system constituting a vehicular automatic transmission as claimed in claim 6, wherein the data vector selected by the first selector is represented by Xi={y(i), y(1=τ), - - - , y(i−(n−1)τ), wherein τ denotes a delay time.

8. An apparatus for discriminating a time series data observed from a dynamical system constituting a vehicular automatic transmission as claimed in claim 7, wherein τ and n are previously set according to the dynamical system constituting the vehicular automatic transmission to be observed.

\* \* \* \* \*